United States Patent [19]

Possati et al.

[11] 4,386,467  
[45] Jun. 7, 1983

[54] GAUGE FOR CHECKING LINEAR DIMENSIONS OF MECHANICAL PIECES

[75] Inventors: Mario Possati; Guido Golinelli, both of Bologna; Narciso Selleri, Monteveglio, all of Italy

[73] Assignee: Finike Italiana Marposs S.p.A., S. Marino di Bentivoglio, Italy

[21] Appl. No.: 263,262

[22] Filed: May 13, 1981

[30] Foreign Application Priority Data

Jun. 2, 1980 [IT] Italy .................................. 3439 A/80

[51] Int. Cl.³ .............................................. G01B 7/12
[52] U.S. Cl. ................................ 33/178 E; 33/143 L; 33/174 L
[58] Field of Search .............. 33/178 E, 143 L, 149 J, 33/178 F, 147 K, 174 L, 174 Q

[56] References Cited

U.S. PATENT DOCUMENTS 3,939,567  2/1976  Albertazzi ......................... 33/178 E
4,238,886 12/1980  Brown ................................ 33/149 J
4,306,455 12/1981  Selceri .............................. 33/178 E

FOREIGN PATENT DOCUMENTS 1321575  6/1973  United Kingdom .
1489759 10/1977  United Kingdom .
1570954  7/1980  United Kingdom .

Primary Examiner—Willis Little
Attorney, Agent, or Firm—Stevens, Davis, Miller & Mosher

[57] ABSTRACT

A gauge for checking linear dimensions of mechanical pieces, comprising a differential transformer transducer including a first member, substantially cylindrical, which supports a core, a second member, substantially cylindrical, which houses electric windings, and a sealing bellows having its ends fixed to the first and the second member, respectively.

The two members are mutually movable and the electric windings provide a measurement signal representative of the position of the core with respect to the second member.

The ends of the bellows are coupled to annular seats defined in the first and the second members, with a coupling which generates substantially compressive stresses at said ends.

11 Claims, 11 Drawing Figures

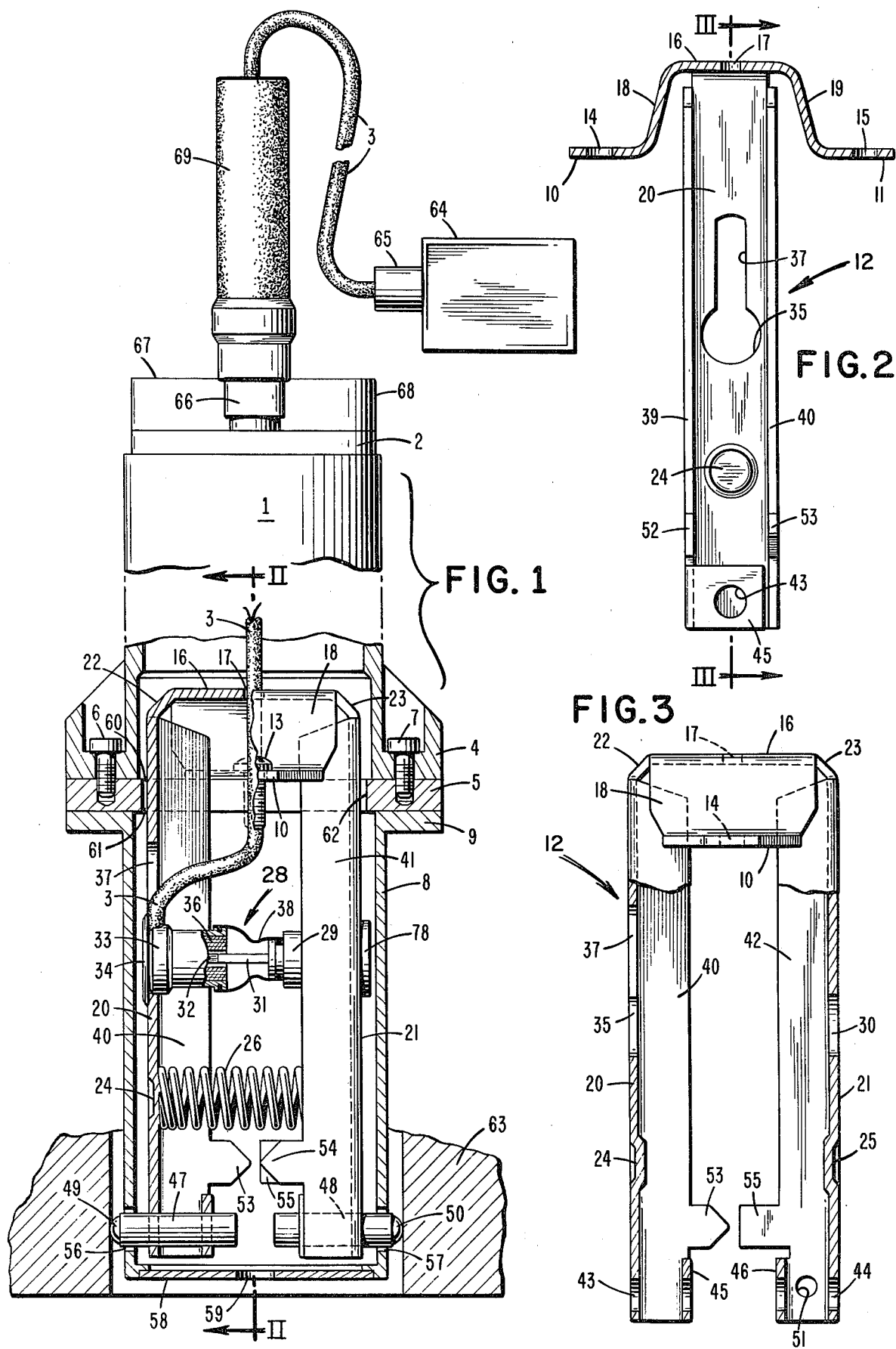

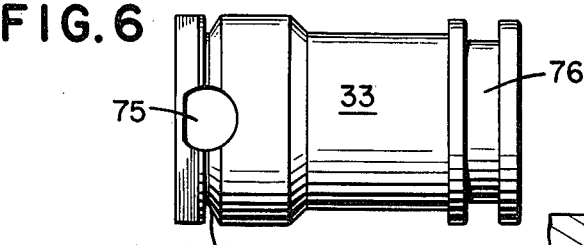
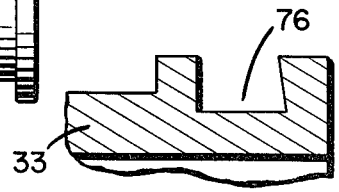
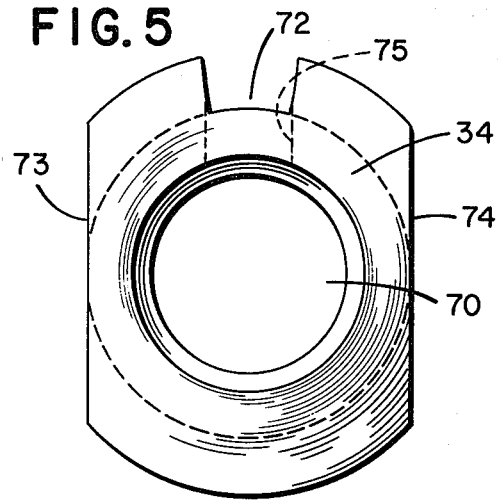
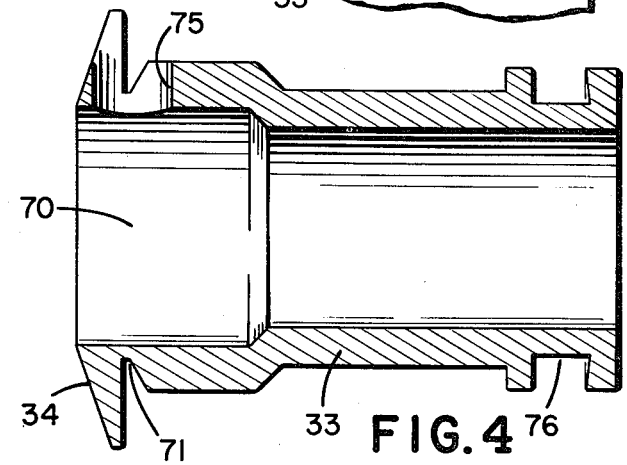
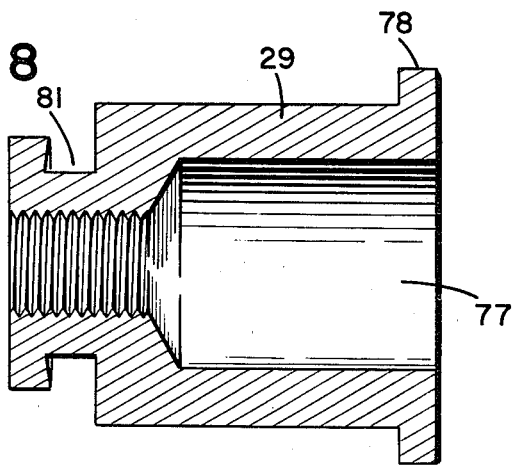
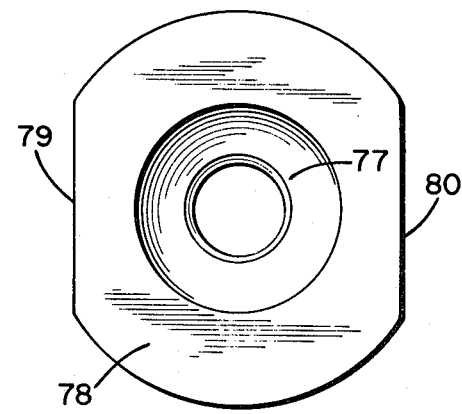
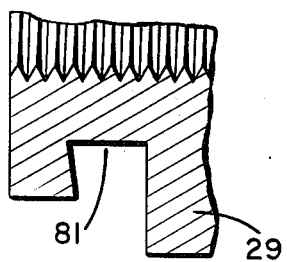
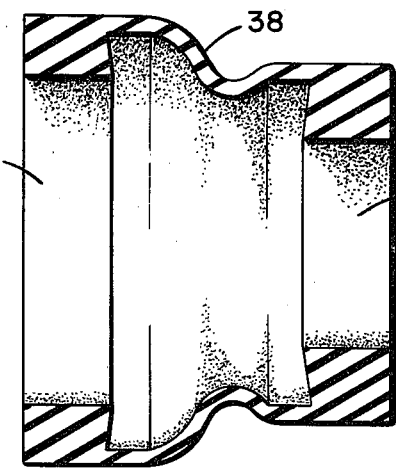

GAUGE FOR CHECKING LINEAR DIMENSIONS OF MECHANICAL PIECES

The present invention relates to a gauge for checking linear dimensions of mechanical pieces, with a first member and a second member, these members being mutually movable; an element fixed to the first member; electric circuits associated with the second member, the electric circuits providing a signal representative of said linear dimensions depending on the position of said element; and a substantially tubular resilient seal, having its ends resiliently fixed to the first member and the second member, respectively, at least one of the ends including an annular portion; at least one of said members having an external surface defining a seat for housing said annular portion.

Conventional gauges are known which comprise an inductive position transducer, particularly a differential transformer transducer, a cylindrical member housing electric windings and another member supporting a magnetic core movable within the windings along a substantially axial direction. It is also known, in these gauges, the use of a sealing bellows having its ends respectively fixed to the two members, by interference fitting generating substantially tensile stresses at the ends of the bellows.

These conventional gauges present some drawbacks due to the effect of the tensile stresses on resilient materials, such as natural or synthetic rubbers and plastics, of which the sealing bellows is made.

As a consequence of the aging of these materials, the desired coupling between the ends of the sealing bellows and the members carrying the windings and the core, may become loose, so that sealing of the transducer is lost.

The object of the present invention is to provide a gauge having a seal which does not present the drawbacks of the conventional gauges.

This problem is solved by a gauge of the kind set forth in which, according to the present invention, said seat is annular and between this annular seat and said annular portion there is a coupling generating substantially compressive stresses in the annular portion.

Further objects and advantages of the invention shall appear from the following detailed description, with reference to the annexed drawings, wherein:

FIG. 1 shows a partly cut-away elevation of a manual plug gauge according to the preferred embodiment of the invention;

FIG. 2 is a sectional view of the arm-set of the gauge taken along line II—II, of FIG. 1;

FIG. 3 is an elevation of the arm-set of FIG. 2, partly cutaway along line III—III;

FIG. 4 is an axial sectional view of an element of the transducer of the gauge of FIGS. 1-3, with an enlarged scale;

FIG. 5 is a side view of the element of FIG. 4;

FIG. 6 is a longitudinal side view of the element of FIGS. 4 and 5;

FIG. 7 shows a greatly enlarged detail of the element of FIG. 4;

FIG. 8 is an axial sectional view of another element of the transducer of the gauge of FIGS. 1-3, with an enlarged scale;

FIG. 9 is a side view of the element of FIG. 8;

FIG. 10 shows a greatly enlarged detail of the element of FIG. 8; and

FIG. 11 is an enlarged axial sectional view of a sealing bellows of the transducer of the gauges of FIGS. 1-10.

With reference to FIGS. 1-3, the manual plug gauge comprises a handle 1, preferably made of plastics, with an upper base 2—perpendicular to the longitudinal geometrical axis of the gauge—, defining a central opening or hole, not visible, for the passage of a cable 3. Handle 1, which is hollow, has substantially cylindrical internal and external surfaces, coaxial with the longitudinal axis of the gauge.

The lower part of handle 1 ends with a flange 4, which serves for coupling the handle to a support element, essentially consisting of a bored plate 5.

The coupling between flange 4 and plate 5 is achieved by two screws 6, 7, passing through bores of flange 5 and screwed into threaded bores obtained in plate 5, in such a way as to clamp the lower face of flange 4 against the upper face of plate 5. Moreover, plate 5 supports a protection and centering nose-piece 8, by four screws, not visible, passing through bores of plate 5 and screwed into threaded bores, not visible, obtained in a flange 9 of nose-piece 8, in such a way that the upper face of flange 9 is clamped against the lower face of plate 5. The four screws for clamping flange 9 are accessible through openings, not visible, obtained in flange 4.

Plate 5 also acts as support element for the arm-set of the gauge, because to the upper face of plate 5 there are coupled the lower faces of two flanges 10, 11, which constitute, together with the arm-set, a single body or member 12, as can be seen in FIGS. 2 and 3; the coupling is obtained by two screws, one of which, 13, is visible in FIG. 1; these two screws pass through bores 14,15 of flanges 10,11 and are screwed into threaded bores of plate 5; seats, not visible, are obtained in flange 4 for housing flanges 10,11 and screws 13.

Flanges 10,11 are oppositely arranged with respect to the vertical plane passing through the gauge axis and the axes of screws 6, 7.

Body 12 which is stamped by bending a shaped sheet made of spring steel, also comprises an upper base 16, having a substantially rectangular perimeter and defining a hole 17 for the passage of cable 3, two connecting parts 18, 19 for connecting flanges 10, 11 to base 16, and two moving arms 20, 21. Arms 20, 21, which are obtained by bending two wings of the above-mentioned spring steel sheet, are connected to upper base 16 through two sections 22, 23,—lightened by relevant chamfers, as shown in FIGS. 1 and 3—, which define two fulcrums for pivotal movement of arms 20, 21 about relevant axes perpendicular to the arms.

Arms 20, 21 have a substantially similar structure, with channel cross-section, for providing high resistance to bending stress, and present in their central sides two substantially cylindrical parts 24, 25—slightly protruding toward the interior—obtained by a partial blanking operation.

The two cylindrical parts 24, 25 constitute seats for housing and abutting the ends of a compression spring 26, which tends to move arms 20, 21 apart from each other. The mutual position of arms 20, 21 is detected by a differential transformer position transducer 28.

Transducer 28 comprises a first member 29, substantially cylindrical, passing through a hole 30 of arm 21 and fixed to the latter through an adhesive. Member 29 shall be more detailedly described hereinafter.

A stem 31 having an end fixed to member 29 carries at the other end a magnetic core 32. Transducer 28 comprises a second member 33, consisting of a substantially cylindrical shell terminating with a flange 34. Shell 33 passes through a hole 35 of arm 20 and is fixed to the latter through an adhesive.

Shell 33, which shall be more detailedly described hereinafter, houses the electric windings 36 of the differential transformer, wherethrough magnetic core 32 is movable along a substantially axial direction, due to the mutual displacements of arms 20, 21.

Cable 3, which is connected to windings 36, gets out of shell 33 and passes through an opening 37 of arm 20, this opening communicating with hole 35. A sealing bellows 38, which shall be detailedly described hereinafter, has its ends fixed to member 29 and shell 33, for sealing transducer 28.

Arms 20, 21 have, as above mentioned, channel cross-sections and thus present bent wings 39,40,41,42; arms 20,21 house at their free ends—within relevant holes 43,44 passing through further bent wings 45, 46—small cylinders 47, 48, which carry relevant feelers 49, 50.

Cylinders 47,48 are clamped by socket head screws, not visible, coupled to threaded rivets, also not visible, fixed to arms 20, 21 and passing through a hole defined by wing 39 and a hole 51 defined by wing 42. By loosening these screws it is possible to adjust the position of the feeler elements, i.e. cylinders 47,48 with feelers 49,50, along the measurement radial direction.

Wings 39, 40 of arm 20 have two protruding sections 52, 53, the first of which ends with a substantially vertical flat side, while the second ends with a narrow horizontal edge. Similarly, wings 41, 42 have two protruding sections 54, 55, the first ending with a narrow horizontal edge and the second with a substantially vertical flat side. Protruding sections 52, 53, 54, 55, which form integral parts of member 12, constitute reference elements for limiting the approaching movements of arms 20, 21. In fact, the free ends of protruding sections 52, 53 are arranged opposite the free ends of protruding sections 54, 55, respectively, with which they get into contact when arms 20, 21 take a determined mutual position such as to prevent any danger of damages in sections 22, 23 and/or in transducer 28. The edge shape of protruding sections 53, 54 reduces the inconveniences deriving from the possible deposit of foreign matters, like dust, grease, chips, etc., and guarantees a substantially constant position of maximum mutual approach of arms 20, 21.

Nose-piece 8 presents openings 56, 57 for the passage of feelers 49, 50 and is closed at its lower end by a base or circular plate 58, perpendicular to the geometric axis of the gauge. Plate 58, suitably fixed to nose-piece 8, presents a central opening 59.

Plate 5 has substantially an annular shape, with a central opening 60, and comprises two parts 61, 62 protruding towards the interior and having approximately the shape of triangular prisms, with chamfered edges. Parts 61, 62,—which are diametrically opposite along a direction perpendicular to that according to which are arranged flanges 10, 11—form reference surfaces for limiting the opening displacements of arms 20, 21. In fact, as can be seen from FIG. 1, arms 20, 21 pass through opening 60 because base 16 and the free ends of arms 20, 21 are arranged at opposite sides with respect to plate 5; in proximity of plate 5, the central side of the channel cross-sections of arms 20, 21 is adjacent to protruding parts 61, 62.

Therefore, if piece 63 shown in FIG. 1 is taken away, the opening displacements caused by spring 26 are limited due to the contact of said central sides of the channel cross-sections of arms 20, 21 with the edges of protruding parts 61, 62.

Conversely, when nose-piece 8 is inserted into the bore of a piece 63 to be checked, feelers 49, 50—which in rest conditions protrude of a determined amount with respect to the external surface of nose-piece 8—cause closing displacements of arms 20, 21, which take a measurement position; then it is possible to read, on an instrument of a supply and detection group 64, connected to a connector 65 arranged at the end of cable 3, the deviation of the bore diameter from the diameter of a master piece which, as it is usual, is used for zero-setting the gauge.

The preceding description shows that a single element, namely plate 5, acts as both a central support—to which there are coupled handle 1, arms 20, 21 (through the intermediate support element including flanges 10, 11, base 16 and lightened sections 22, 23) and nose-piece 8—and a limiting device for limiting the opening displacements of arms 20, 21.

Limiting of the opening displacements is obtained, as described above, by two parts 61, 62 of plate or ring 5, which protrude towards the interior and which, having ends shaped substantially as sharp edges, define reference surfaces of limited areas, thus reducing the effects of foreign matters which may deposit on arms 20, 21 or on the reference surfaces and providing a limitation of the arms opening at a value substantially constant.

Handle 1 comprises, on upper base 2, two lugs, one of which, 66, shown in FIG. 1, having a shape substantially prismatic but with two sides constituting parts of cylindrical surfaces having the same diameter as that of base 2.

The gauge also comprises a cable clamping device including two elements 67, 68 which are clamped, through screws not shown, against lugs 66. Elements 67, 68 include semi-cylindrical threaded seats, not visible, which clamp the sheath of cable 3. To elements 67, 68 there is coupled an end of a rubber hose 69 which is provided for stiffening cable 3, for preventing possible breakages of its sheath in proximity of the cable clamping device.

The cable clamping device prevents damages of the wires of cable 3 and transmission of mechanical forces acting on cable 3—at the exterior of the gauge—to the cable portion housed within handle 1 and consequently from this cable portion to moving arm 20.

Holes, not visible, obtained in elements 67, 68, communicate with a hole, also not visible, obtained in upper base 2 of handle 1. These holes, as well as openings 59, 60 permit to clean the interior of the gauge without any necessity of disassembling any gauge element. In fact, by means of a nozzle inserted through opening 59, it is possible to blow compressed air or another suitable fluid in the support and protection shell consisting of nose-piece 8 with plate 58, plate 5 and handle 1. The compressed air, which flows within the plug gauge substantially from down to up passing through the interior of nose-piece 8, opening 60 and the interior of handle 1, removes any foreign material and flows out towards the exterior, together with the foreign material, through the holes obtained in base 2 and elements 67, 68. Partially, the compressed air also flows out through the annular gaps delimited by cylinders 47, 48 and by the surfaces of openings 56, 57.

Due to its simplicity, the cleaning operation may be frequently carried out, for surely preventing the deposit, on gauge elements critical for the proper gauge operation—such as cylinders 47, 48, protruding parts 61, 62, reference surfaces defined by sections 52, 53, 54, 55, arms 20, 21, spring 26, and lightened sections 22, 23—, of foreign material in a quantity which might seriously affect the accuracy and repeatability of the measurements or cause some surfaces to oxidize. Transducer 28, since it is sealed by bellows 38, is not detrimentally influenced by the cleaning operation through compressed air.

The hole of handle base 2 is diametrically dimensioned in such a way as to permit withdrawal of handle 1—after having disconnected connector 65 from group 64, disassembled the cable clamping device, and loosened screws 6, 7—by letting cable 3 and connector 65 pass through the same hole.

In this way assembling and disassembling of the gauge are rendered easy and it is possible to assemble the gauge by easily and quickly assembling a plurality of unfinished products, one of which constituted by the handle and another by an arm-set equipped with transducer, cable and connector.

The transducer shell 33 has a through hole 70 wherein there are housed windings 36. The fixing of windings 36 and the sealing of the hole 70 end adjacent to flange 36 are carried out by a suitable resin. The fixing of shell 33 to arm 20 is also carried out by a resin, which can be applied in part within a slot 71 obtained in the external surface of the shell, near flange 34. Flange 34, which abuts against the central side of the channel cross-section of arm 20, presents a cut 72 and two chamfers 73, 74, which are provided for permitting to detach, by a suitable tool, shell 33 from arm 20.

A hole 75 passing through shell 33, permits the passage of cable 3.

The end of shell 33 opposite that including flange 34 presents an annular slot 76 having a cross-section with a substantially rectangular-trapezoidal shape, as can be better seen in the detail of FIG. 7.

Member 29 of transducer 28 defines, as shown in FIGS. 8-10, a through hole 77 including two sections having different diameters which are connected by a frusto-conical section. Hole 77 has a threaded end to which there is screwed stem 31, for permitting axial adjustments of the latter. Stem 31 is locked in a way not shown and hole 77 is sealed by a suitable resin.

Member 29 has a flange 78 defining two side chamfers 79, 80, which abuts against the central side of the channel cross-section of arm 21. The end of member 29 opposite to that having flange 78 presents an annular slot 81, having a cross-section with a substantially rectangular-trapezoidal shape, as shown in the detail of FIG. 10.

As shown in FIG. 11, bellows 38 has substantially a tubular form and terminates at its ends with two annular portions 82, 83 protruding towards the interior. Annular portions 82, 83 have cross-sections with substantially rectangular-trapezoidal shapes.

The coupling of bellows 38 to member 29 and shell 33 is carried out by fitting annular portion 82 in slot 76 and annular portion 83 in slot 81. The dimensions of slots 76, 81 and of annular portions 82, 83 are chosen to obtain a coupling by interference-fit owing to which annular portions 82, 83 are subjected substantially to resilient compressive stresses, along the direction of the axis of bellows 38.

Therefore, in rest condition, the thicknesses of annular portions 82, 83—along the direction of the axis of bellows 38—are larger than the widths of the corresponding sections of slots 76, 81, respectively.

The internal diameters of annular portions 82, 83 in correspondence with the larger bases of the trapezoidal figures defined by the cross-sections of the same annular portions, are substantially equal to the external diameters of shell 33 and member 29 in correspondence with the bottom of slots 76, 81.

The above described shapes of bellows 38 and slots 76, 81 and the consequent coupling generating compressive stresses in annular portions 82, 83 have been found to generate very safe coupling and sealing, even after a considerable aging of the material—such as natural or syntetic rubbers and plastics—of which bellows 38 is made. Another advantage resides in that the mutual positions of annular portions 82, 83 with respect to shell 33 and member 29—along the direction of the bellows 38 axis—are strictly constant.

Thus, a very good sealing of transducer 28 is achieved and this prevents any negative influence on the transducer of the above described cleaning operations.

Obviously, the invention can undergo changes and variants equivalent from a functional and structural point of view without departing from its scope.

For example, a seal or gasket similar to the described sealing bellows, possibly with different cross-sections of the annular portions, can be used for providing sealing between a feeler carrying stem and a bushing. Moreover, it is possible to provide a coupling subjected to compressive stresses on only one of the annular portions of the seal.

What is claimed is:

1. Gauge for checking linear dimensions of mechanical pieces, comprising a first member and a second member, these members being mutually movable; an element fixed to the first member; electric circuits associated with the second member, the electric circuits providing a signal representative of said linear dimensions depending on the position of said element; and a substantially tubular resilient seal having its ends resiliently fixed to the first member and the second member, respectively, at least one of the ends including an annular portion; at least one of said members having an external surface defining a seat for housing said annular portion, wherein said seat is annular and the annular portion is coupled to the annular seat substantially by compressive interference-fit couplings, whereby the annular portion is subjected substantially to resilient compressive stresses.

2. The gauge according to claim 1, wherein said annular portion and said seat have substantially trapezoidal cross-sections.

3. The gauge according to claim 2, wherein said cross-sections have substantially rectangular-trapezoidal shapes.

4. The gauge according to claim 3, wherein each of said first member and second member defines substantially a cylindrical external surface, these external surfaces defining said annular seat and a further annular seat, for housing relevant ends of said resilient seal; the two ends of the seal including said annular portion, and a further annular portion, the two annular portions being fit in said annular seats by compressive interference-fit coupling and being subjected substantially to resilient compressive stresses.

5. The gauge according to claim 4, further including two moving arms carrying relevant feelers for contacting the piece to be checked and wherein said electrical circuits, said first and second member and said element define a transducer for providing said signal as representative of the mutual position of the two arms, the transducer including electrical windings, the second member including a shell fixed to one of said arms for housing said windings and the first member defining a support for said element, the support being fixed to the other arm.

6. The gauge according to claim 5, wherein said shell defines a through hole for housing said windings, a flange for cooperating with a side of the relevant arm and a lateral hole for the passage of the wires of said windings.

7. The gauge according to claim 6, wherein said flange defines a hole, this hole being sealed by a resin.

8. The gauge according to claim 7, wherein said transducer is a differential transformer transducer, said element defining the core of the differential transformer transducer.

9. The gauge according to claim 8, wherein said support comprises a flange for cooperating with the relevant arm, a substantially cylindrical section and a stem coupled to the cylindrical section and carrying the core.

10. The gauge according to claim 9, wherein the transducer is sealed.

11. Gauge for checking linear dimensions of mechanical pieces, comprising:
a first member and a second member, these members being mutually movable and having external surfaces defining two annular seats, the annular seats having relevant annular bottom surfaces;
an element fixed to the first member;
electric circuits housed by the second member, for provising a measurement signal representative of said linear dimensions depending on the mutual positions of said members; and
a substantially tubular resilient seal defining a geometrical axis and having two annular end portions;
wherein the annular portions and the annular seats have cross-sections with substantially trapezoidal shapes, the annular portions defining two internal surfaces-spaced along said geometrical axis—, each internal surface having a diameter substantially equal to the diameter of a corresponding annular bottom surface, each of the annular portions having a thickness—along said geometrical axis—larger than a corresponding width of the cross-section of a relevant annular seat, and wherein the annular portions are respectively coupled to the annular seats by compressive interference-fit couplings generating substantially resilient compressive stresses in the annular portions.

* * * * *